United States Patent

[11] 3,624,174

| [72] | Inventor | Gerald Sugerman<br>Parsippany, N.J. |
|---|---|---|
| [21] | Appl. No. | 36,407 |
| [22] | Filed | May 11, 1970 |
| [45] | Patented | Nov. 30, 1971 |
| [73] | Assignee | Chem Systems, Inc.<br>New York, N.Y. |

[54] RECOVERY OF ANTHRACENE AND CARBAZOLE
9 Claims, No Drawings

| [52] | U.S. Cl. | 260/675, 260/318 |
|---|---|---|
| [51] | Int. Cl. | C07c 15/28 |
| [50] | Field of Search | 260/675, 318 |

[56] References Cited

UNITED STATES PATENTS

| 2,783,287 | 2/1957 | Nickolls et al. | 260/675 |
|---|---|---|---|
| 2,894,047 | 7/1959 | Uitti | 260/675 |
| 3,331,853 | 7/1967 | Halden | 260/675 |

FOREIGN PATENTS

| 1,490,148 | 6/1967 | France | 260/675 |
|---|---|---|---|

*Primary Examiner*—Curtis R. Davis
*Attorney*—Bert J. Lewen

ABSTRACT: This invention is directed towards an improved process for obtaining anthracene and carbazole from mixtures thereof containing phenanthrene. More specifically, the invention teaches the removal of the anthracene and carbazole from such admixtures by means of azeotropic distillation and selective crystallization.

RECOVERY OF ANTHRACENE AND CARBAZOLE

Anthracene, carbazole and phenanthrene, among other things, can be obtained from the distillation of coal tar. Other components appear in such mixtures including fluorene, acridine and naphthalene. The percentage of these various components in coal tar mixtures may vary widely depending upon the particular source.

At the present time the main commercial use for anthracene is for the production of anthraquinone, a basic building block in the manufacture of dyes and pigments. Neither carbazole nor phenanthrene have widespread commercial uses because of their limited availability as a raw material. However, these compounds are useful in manufacturing specialty dyes.

Since they tend to cocrystallize from the more commonly used solvents, the separation of anthracene and carbazole is conventionally achieved by fractional crystallization from expensive and toxic solvents, such as pyridine or dimethyl sulfoxide. Even with the use of these expensive solvents, it is essential that the anthracene/phenanthrene ratio be at least 0.5 to prevent cocrystallization and relatively poor product recoveries. For example, less than 70 percent anthracene can be recovered from crude mixtures having concentrations of less than 60 percent thereof. Additionally, the use of pyridine or dimethyl sulfoxide does not result in a carbazole concentrate which can be easily processed to recover carbazole.

The separation of anthracene and carbazole by distillation was believed to be impractical because of the similarities of the vapor pressures at operable temperatures: both compounds boil at 351° C. In French Pat. No. 976,773, it is taught that anthracene and carbazole can be recovered from phenanthrene-free coal tar distillates by distillation by forming an azeotropic mixture with a solvent, such as glycol; however, the process has not proven to be commercially viable because the patentee teaches that such process is only feasible if the phenanthrene in the distillate is first removed by washing with tar oil. The washing step results in the loss of a large portion of the anthracene, thereby depleting the amount of product available for recovery.

In accordance with this invention, it has now been found that anthracene and carbazole can both be readily separated from a mixture containing phenanthrene by first distilling the mixture in the presence of an azeotropic solvent. There is no need to initially separate the phenanthrene. In the process of the invention, the azeotropic solvent enhances the relative volatility of both the anthracene and the phenanthrene as compared to carbazole. The former two components are removed as the distillate. The concentration of anthracene in the distillate varies as a function of solvent and operating pressure. For example, at one atmosphere, and when ethylene glycol is used as the solvent, the anthracene content in the distillate is about 2 percent by weight. On the other hand, where ethylene or propylene carbonate is used, the anthracene content is about 10 percent by weight.

Surprisingly, the particular azeotropic solvents employed here exhibit a high degree of preferential solubilization for the phenanthrene as compared to the anthracene, thereby permitting the recovery of relatively pure anthracene merely by cooling the distillate material to a temperature between 0° and 100° C. The crystallized anthracene is separated from the distillate and the mother liquor recycled to the distillation column. The azeotropic solvent may be removed from the anthracene by washing with an organic solvent such as alcohol, benzene, naphthalene or alkylated derivatives thereof, e.g., toluene, xylene, pseudocumene and methyl naphthylene.

After the anthracene content in the distillation column is reduced to less than 10 percent, based on the carbazole, carbazole may be readily recovered from the residue by extraction from said residue with xylene, benzene or ethanol and crystallization. The carbazole present in the residue can also be recovered by extraction with a strong acid, such as sulfuric acid, or a strong base, such as sulfuric acid, or a strong base, such as sodium hydroxide. After extraction of the carbazole, by either of the techniques mentioned above, the phenanthrene can be recovered by extraction with an aromatic followed by conventional crystallization.

The azeotropic solvents which may be used in accordance with the invention include ethylene glycol, ethylene carbonate, propylene carbonate and their higher molecular weight homologues.

From 1 to 100 parts by weight of the azeotropic solvent per part of anthracene in the feed should be employed, preferably from 50 to 100 parts. In order to remove all the anthracene present in the feed, the coal tar distillate should be contacted with at least 40 parts of the solvent per part of anthracene in the feed. The azeotropic distillation can be carried out at pressures ranging from 0.1 to 10 atmospheres, preferably 1–2 atmospheres.

The temperature in the distillation unit will be determined by the system pressure. Temperatures much above 300° C. are detrimental for product recovery and quality. The anthracene in the distillate, upon cooling below 100° C., crystallizes out while the phenanthrene, due to its higher solubility, stays in solution. The crystals can be filtered and washed either with the azeotropic solvent or preferably with a more volatile liquid, such as xylene, toluene, benzene. The wet and washed cake is then dried in the absence of oxygen in order to avoid oxidation of the anthracene. The drying temperature is determined by the wash liquor volatility. In the case of xylene, the crystals can be dried at around 70°–80° C.

A typical feed stock which may be purified by the practice of the invention may be obtained from coal tar, preferably after chilling, centrifugation and naphtha washing. Other suitable fraction are from the bottoms of catalytic cracking and gas oil cracking processes. These feed stocks generally contain from 5 to 50 percent anthracene, 1 to 50 percent carbazole, and from 10 to 85 percent phenanthrene.

In order to describe more fully the instant invention, attention is directed to the following examples.

EXAMPLE 1

A cresote oil press cake derived from the distillation of coal tar and consisting of a crude mixture of 40 percent anthracene, 36 percent carbazole, 21 percent phenanthrene, 1 percent fluorene, and 0.5 percent acridine, together with about 1.5 percent of unidentified materials, was placed in a distillation unit equipped with a 20-tray Oldershaw column, a 100° C. pumped oil cooled condenser, and an automatic liquid reflux splitter. Five parts by weight of ethylene glycol per part of crude were added and the resulting mixture distilled at atmospheric pressure at a reflux ratio of 2:1 The overhead was collected until 80 percent of the glycol was distilled, then cooled to ambient and filtered. The filtrate was returned to the still without intermediate purification and recycled. The filter cake was washed with benzene and oven-dried at 125° C. After about 20 glycol filtrate recycles, the purified anthracene recovered was combined, washed with xylene, and oven-dried. Anthracene recovery (purity 99 percent by G.L.P.C.) was 39.2 percent of the initial feed weight or 98 percent of theory. The stillpot residue was concentrated to remove the bulk of residual glycol then recrystallized twice from toluene to recover purified carbazole (purity 95 percent by G.L.P.C.). The purified carbazole was 30.4 percent of the initial feed weight, i.e., 84 percent of theory.

EXAMPLE 2

The process described in example 1 was repeated except that the initial feedstock analysis was: anthracene 9 percent, phenanthrene 72 percent, carbazole 7 percent, fluorene 4 percent, acridine 3 percent, balance undetermined, and the glycol codistillation was stopped after only 12 recycles. The recovery of anthracene and of carbazole were 96 percent and 72 percent of theory, respectively.

EXAMPLE 3

The process described in example 1 was repeated except that ethylene carbonate replaced ethylene glycol as the azeotropic solvent used and solvent recycle was reduced to six passes. Anthracene and carbazole recovery were 95 percent and 81 percent of theory, respectively.

EXAMPLE 4

The process described in example 1 was repeated except that propylene carbonate replaced the ethylene glycol used in the cited example and that the number of extractive solvent recycles was reduced to four. The recovery of anthracene and of carbazole were 95 percent and 70 percent of theory, respectively.

Having thus described my invention, what I claim and desire to protect by Letters Patent is:

1. A process for the recovery of anthracene from a mixture containing phenanthrene and carbazole which comprises : distilling said mixture in the presence of an azeotroping solvent which forms a minimum boiling azeotrope with anthracene; crystallizing anthracene from the distillate; separating said anthracene crystals from said distillate; and recycling the remaining mother liquor back to said distillation.

2. The process of claim 1 wherein the azeotropic solvent is ethylene glycol.

3. The process of claim 1 wherein the azeotropic solvent is ethylene carbonate.

4. The process of claim 1 wherein the azeotropic solvent is propylene carbonate.

5. The process of claim 1 wherein said anthracene crystals are washed with an organic solvent, said solvent being capable of dissolving at least five weight-percent of both the azeotropic solvent and phenanthrene.

6. The process of claim 5 where said organic solvent is an aromatic compound.

7. The process of claim 6 wherein said aromatic compound is benzene, toluene, xylenes, pseudocumene or a napthalene compound.

8. The process of claim 1 wherein the concentration of anthracene in said mixture is between 5 and 50 percent by weight and the phenanthrene content is between 10 and 85 percent by weight.

9. The process of claim 1 wherein said distillation is carried out until the anthracene concentration of the residue is less than 10 percent based on the carbazole, wherein the residue mixture is mixed with a solvent, and wherein carbazole is separated from the mixture by crystallization.

* * * * *